Patented Nov. 9, 1937

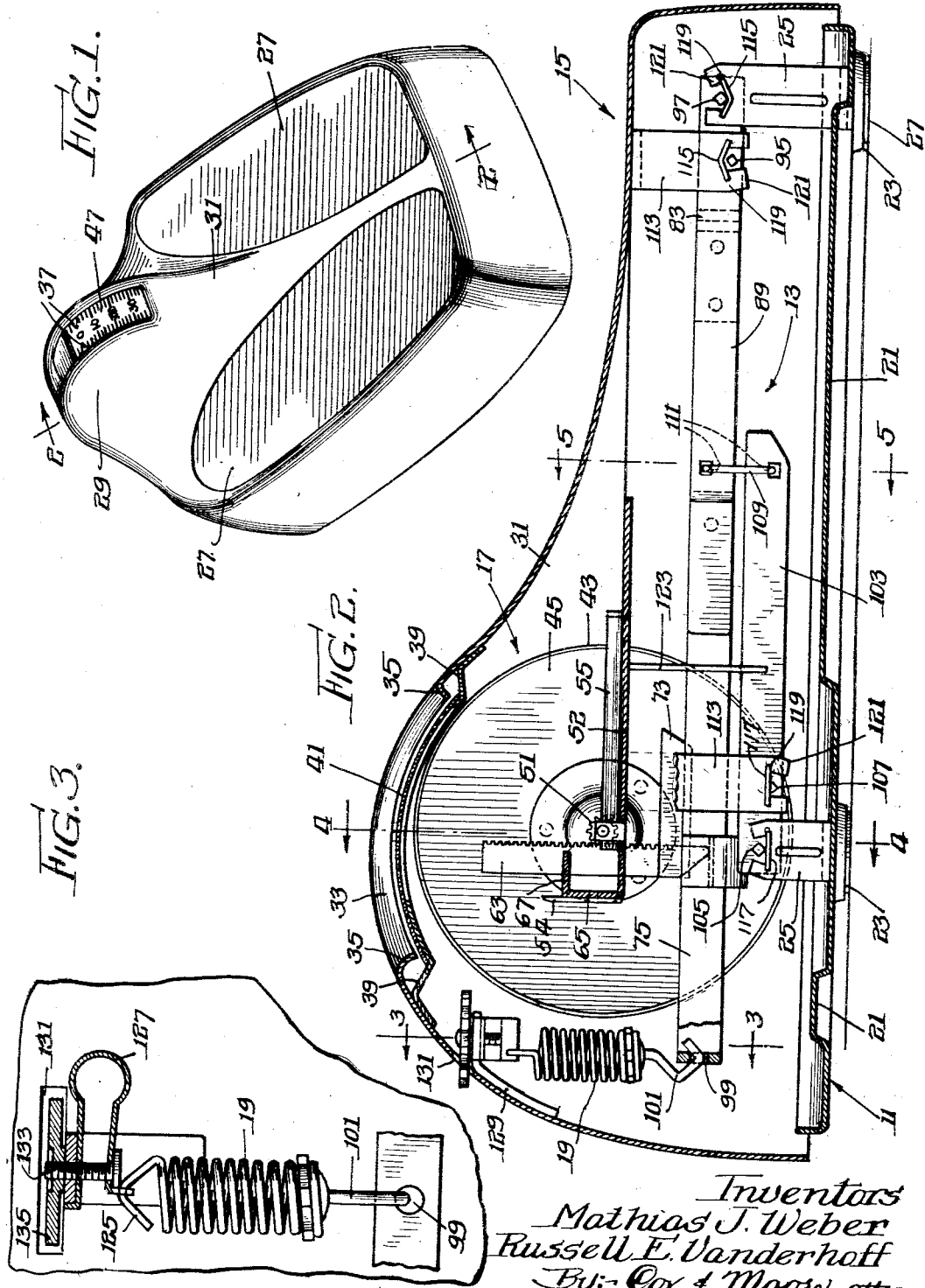

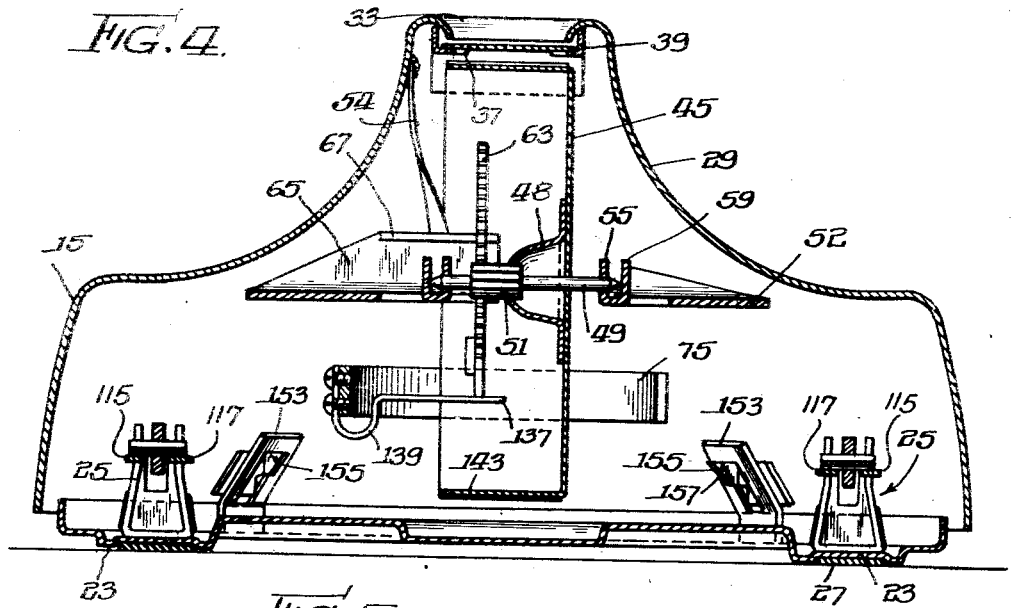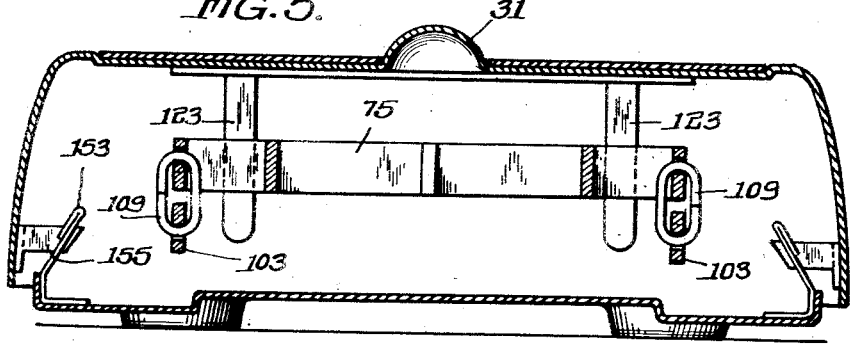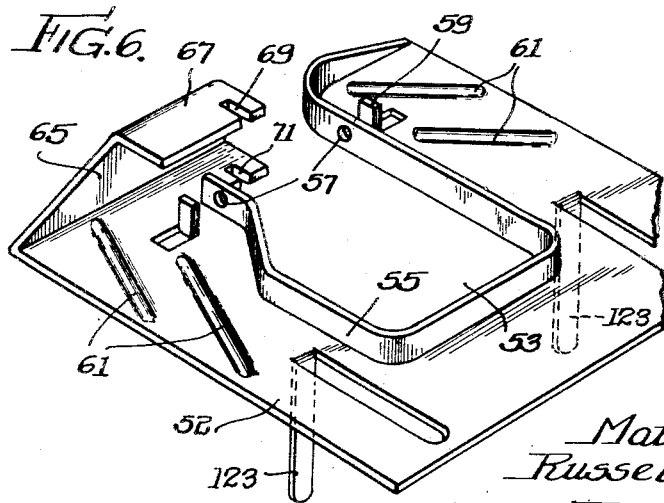

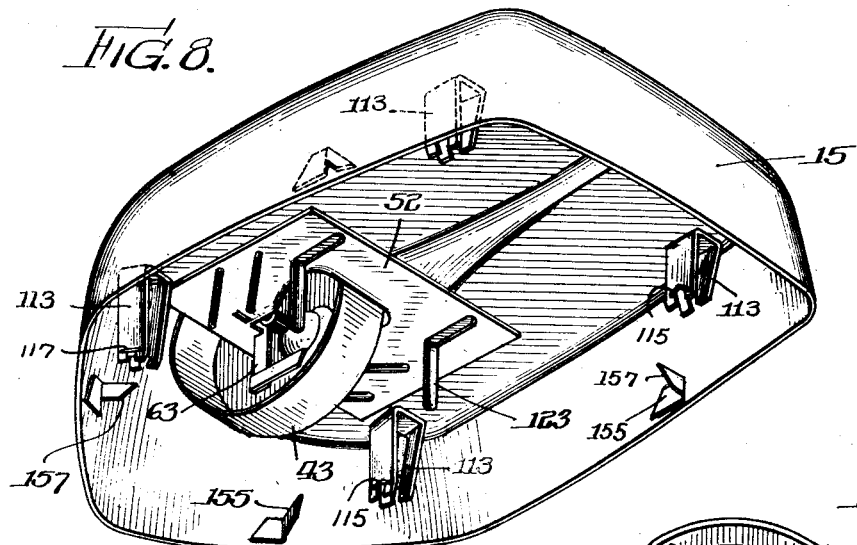
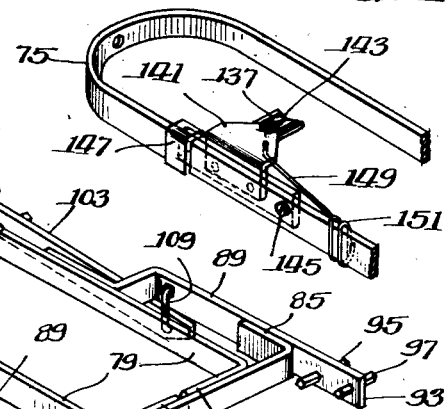
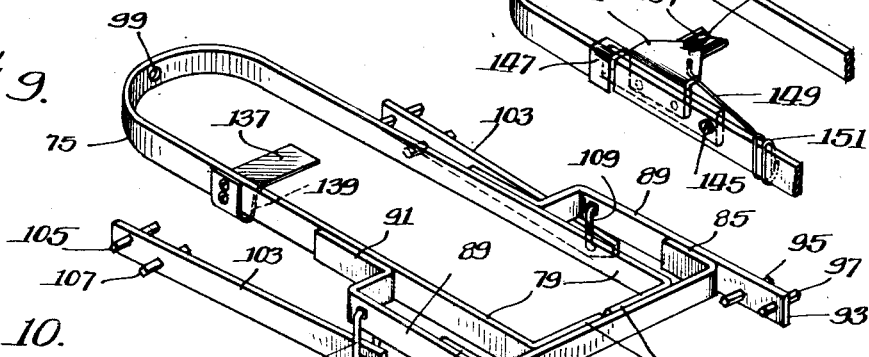
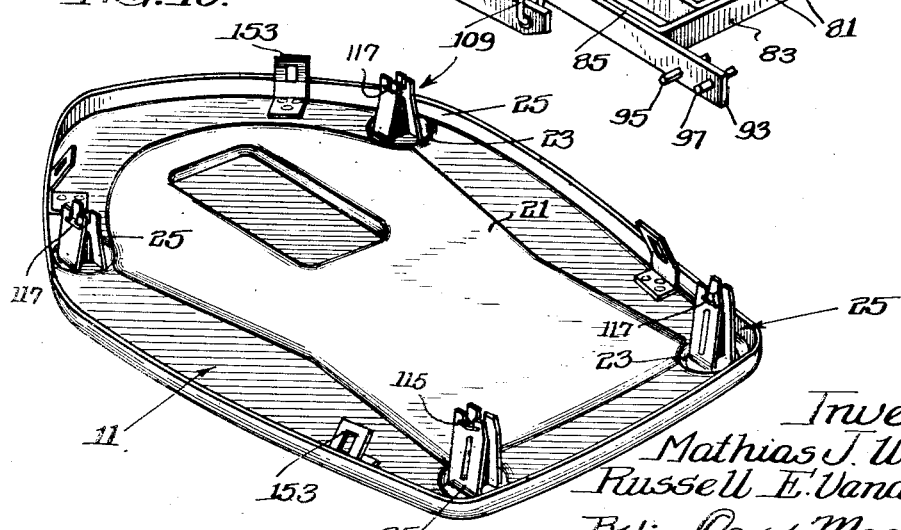

2,098,846

UNITED STATES PATENT OFFICE 2,098,846

WEIGHING SCALE

Mathias J. Weber and Russell E. Vanderhoff, Chicago, Ill., assignors to Continental Scale Corporation, Chicago, Ill., a corporation of Delaware Application May 19, 1936, Serial No. 80,520

16 Claims. (Cl. 265—68)

Our invention relates in general to weighing scales and has more particular reference to a scale having a weight carrying platform relatively close to the floor and adapted for use as a personal weight scale.

An important object of the present invention is to provide a scale of inexpensive construction and having high space efficiency as a result of the novel and compact arrangement of its parts; a further object being to provide structural improvements whereby the manufacturing cost of the scale is reduced considerably without sacrificing accuracy or efficiency.

Another important object is to provide a weighing scale, including weighing mechanism and a cooperatively associated indicator actuated by the weighing mechanism, and including an integral, one piece element forming a weighing platform carried by the weighing mechanism, said platform element forming also a housing for the indicator and the weighing mechanism; a further object being to form the integral platform and housing forming element as a sheet metal stamping.

Another important object is to provide a personal weighing scale, wherein the weight receiving platform comprises a drawn sheet metal shell of relatively thin sheet metal stock, the shell providing a housing for the weighing and indicating mechanism of the scale and formed to reduce deflection of the platform under the influence of a weight to be measured.

Another important object is to provide a weighing scale including weighing mechanism and cooperatively associated indicating means drivingly connected with the weighing mechanism, and an integral drawn sheet metal element of relatively thin, flimsy stock providing a weight receiving platform carried by the weighing mechanism and forming a housing for the indicating means and the weighing mechanism, the shell having a dome-like portion for enclosing the indicating means, and a flute interconnecting the dome-like portion with the platform and integral with each for the purpose of strengthening the platform against bending under the influence of a weight applied thereon.

Another important object is to provide a weighing scale adapted to measure weight against the extension of a spring and having simplified and improved means to regulate spring tension; a further important object being to provide a scale having means forming a weight receiving platform carried on weighing mechanism wherein the weight measuring spring is interconnected between the weighing mechanism and the weight receiving platform element, the spring regulating means comprising an adjustable spring mounting on the platform element.

Another important object is to provide a weighing scale having a weighing mechanism and weight indicating means, and a shockless drive embodying yielding means drivingly connecting the weighing mechanism with the indicating means; a further object being to form said shockless drive as a spring pressed plate or blade on the weighing mechanism in position to engage an indicator actuating element.

Another important object resides in providing a scale having a base, weighing mechanism comprising interconnected levers fulcrumed on the base and a weight receiving platform on said levers including improved and simplified pivots and bearings for supporting the levers on the base and for supporting the platform on the levers.

Another important object is to provide a weighing scale having weighing levers of simplified construction comprising preformed sheet metal elements assembled and integrated to form a lever system.

Another important object is to provide a weighing scale, including a weight carrying platform comprising a drawn sheet metal element forming a housing for the weighing mechanism and weight indicating means, the housing including a dome-like portion for receiving the indicating means and including a strengthening plate on the housing and forming a mounting for the indicating means; a further object being to form said plate with guiding means for retaining the weighing levers in their bearings.

Another important object resides in mounting the weight indicator directly on the weight receiving platform element; a further object being to form the indicator as a rotating drum carried on an axle supported in the platform element; a still further object being to mount a drum driving gear on the axle in driving relationship with respect to the drum.

Another important object is to form the rotatable indicating element with a cup-shaped reinforcement and to attach the driving gear to the drum by forming a splined connection between the teeth of the gear and corresponding toothed portions of the drum reinforcement.

Another important object is to provide a rack for rotating the gear and to guide the rack in a way formed in a reinforcing plate, which also supports the rotatable indicating element.

Another important object is to form the shaft, on which the rotatable indicating element is mounted, with hardened and pointed ends, and to support the shaft against longitudinal movement by striking lugs from the plate in which the shaft is journalled in position to abut against the pointed ends of the shaft.

Another important object is to provide a weighing scale having a support base comprising a formed sheet metal plate provided with offset depressions for strengthening the same, including depressed pockets and bearing pedestals in said pockets for supporting the weighing mechanism.

Another important object is to provide a weighing scale wherein the base, casing and indicator are formed entirely of drawn, stamped or otherwise formed sheet metal parts whereby to reduce the manufacturing costs.

These and numerous other objects, advantages and inherent functions of the invention will become apparent as the same is more fully understood from the following description, which, taken in connection with the accompanying drawings discloses a preferred form of the invention.

Referring to the drawings:

Figure 1 is a perspective view of a weighing scale embodying the present invention.

Figure 2 is a sectional view taken substantially along the line 2—2 in Figure 1.

Figures 3, 4 and 5, respectively, are sectional views taken substantially along the lines 3—3, 4—4 and 5—5 in Figure 2.

Figures 6 to 10 are perspective views of parts of the scale.

Figure 11 is a modified form of one of the parts.

To illustrate our invention we have shown on the drawings a scale of the relatively low platform type adapted for use as a personal weight scale and comprising means forming a base 11, in which is mounted weighing mechanism comprising a lever system 13, a weighing platform 15 carried by the lever system and comprising a shell-like element forming a housing for the weighing mechanism and weight indicating means 17, which is driven by the movement of the levers. The weighing mechanism also carries a spring 19, which is anchored between the housing and platform element 15 and the lever system so that a weight on the platform may be measured against the deflection of the spring.

The base 11 comprises a sheet metal plate deformed as at 21 for strengthening purposes and having depressions 23 for receiving pedestals 25 on which the lever system is mounted. The depressions are preferably formed with downwardly facing sockets for receiving preferably rubber disks adapted to form resilient feet for the scale. The pedestals 25 comprise sheet metal strips of substantially U-shaped configuration, which are anchored in the depressions 23, preferably being secured in place as by spot welding with the arms of the strips extending upwardly of the base and carrying bearings at their upper ends.

The platform and housing element 15 preferably comprises a drawn sheet metal shell having platform portions 27, adapted to receive the feet of a person to be weighed, and a dome-like portion 29 extending upwardly of and between the platform portions 27 at one end of the shell, said dome having a ridge 31 extending downwardly between the platform portions 27 from the dome toward the other end of the shell for the purpose of providing a longitudinal strut or buttress for strengthening the platform portions against bending deflection under the influence of a weight applied thereto for measurement on the scale. An opening 33, defined by inwardly curled edges 35 of the shell, is formed in position facing upwardly in the top of the dome, the opposite side edges of the opening having aligned pointers 37. Within the shell a pair of brackets or lugs 39 carry a preferably curved sheet of transparent material 41 in position to close the opening 33, and the indicating means 17 is mounted in the shell behind said sheet 41 in position visible through the opening 33.

The indicating means 17 comprises a cylindrical element 43 having an end wall 45, the cylindrical wall 43 carrying on its outer surfaces graduated weight scale means 47, the indicator element being journalled in the shell in position to rotate opposite the window 33. The end wall 45 of the indicator element has a cup-shaped mounting 46 secured on the wall 45 in position extending within the cylindrical wall 43 and the element is carried on a shaft 49 which extends through an opening disposed centrally of the wall 45, and through an opening in the top of the cup-shaped element 46. The shaft 49 also carries a pinion 51, the teeth of which are splined to the top of the cup-shaped element 46, the opening of which is formed to mesh with said teeth of the pinion, the pinion being press fitted into said opening and held in place merely by the frictional engagement with the cup-shaped element 47.

The opposite ends of the shaft 49 are pointed and preferably hardened, and the shaft is journalled in a plate 52, which in turn is secured to and within the shell 15 in any suitable fashion, as by spot-welding it to the platform portions 27 on opposite sides of the dome-like portion 49 and by means of the hanger strap 54. The plate 52 is preferably of sheet metal and has an interior opening 53 for the reception of the rotatable cylinder 43, said opening 53 being defined by a flange 55 which not only strengthens the plate, but also is provided with openings 57 for the reception of the opposed ends of the shaft 49. The shaft and its cylinder may be mounted in the plate by sliding one end of the shaft 49 into one of the openings 57 and then sliding the other end of the shaft into the other opening. After the shaft is thus mounted with its pointed ends projecting outwardly of the flange 55, the shaft is anchored in position against endwise movement by lugs 59 struck from the plate 52 in position to abut the opposite pointed ends of the shaft. It will be seen that by pointing the ends of the shaft friction between shaft and the anchoring lugs 59 is reduced to a minimum.

It will be seen also that the rotatable element 53 and its driving gear 51 need not necessarily be fixed on the shaft, but relative rotation with respect to the shaft will not interfere with the operation or accuracy of the scale.

The plate 52 may, if desired, be formed with strengthening embossments 61.

The rotatable indicator element 43 may be driven by the weighing levers in any suitable or preferred fashion, but we prefer to provide a rack element 63, which is mounted and guided for sliding movement on the plate 52 in position to drivingly engage the pinion 51. To this end the plate 52 has an upstanding portion 65, the upper edge of which is provided with an inturned flange 67. The flange and the plate are formed respectively with aligned slots 69 and 71 adapted to receive the rack 63 and hold it in position longitudinally movable with respect to and in engagement with the pinion 51. The rack 63 extends below the plate 52 and has an arm 73 forming a weight in position to tilt the rack whereby to provide snug driving engagement with the pinion, so that when the weighing mechanism moves the arm and rack upwardly on the plate 52 the rotatable scale carrying element 43 will be turned in order to provide a weight indication by means of the pointers 37 and the scale 47.

The lever system 13 is illustrated in Figure 9, and comprises a main lever element 75, which extends from end to end of the scale. This lever 75 comprises a strip of sheet metal bent at its mid-portion to substantially U-shaped configuration, and providing substantially parallel spaced apart arms 79, the ends of which are preferably flanged as at 81 and secured together by means of a cross-brace 83, to which the flanges are preferably welded or otherwise attached. The opposite ends of the brace element 83, which is likewise preferably of sheet metal, are flanged as at 85 in order to receive preferably sheet metal pivot carrying elements 89, comprising sheet metal strips flanged and offset and secured at one end, as by welding at 91, to the arms 79. The medial portions of the pivot carrying elements 89 likewise are preferably secured as by welding to the flanged portions 85 of the cross element 83, the pivot carrying ends 93 of the elements 89 projecting outwardly of the cross element 83. The elements 89 carry pivots 95 and 97 in their ends 93, the pivots 95 and 97 preferably comprising hardened steel bars of prismatic shape defining knife edges and projecting on opposite sides of the pivot carrying portions 93. The pivots 95 and 97 in the arms 85 are in alignment and have uniform spacement on opposite sides of the lever. The lever 75 also has a perforation 99 in its portions opposite from the pivots for anchorage of a hook 101 mounted at one end of the weighing spring 19. It will be seen therefore that the lever 75 comprises integrated sheet metal strips and we find that this type of construction is much less expensive than the usual cast construction heretofore employed.

The lever system also comprises a pair of auxiliary levers 103, each carrying pivots 105 and 107 at one end thereof, the pivots 105 and 107 comprising hardened steel shafts of prismatic form providing knife edges similar to the pivots 95 and 97. The other ends of the levers 103 are connected by links 109 to the elements 89, said elements 89 and the levers 103 having perforations for receiving the links 109. The links 109 comprise loops of hardened wire, the portions of which bearingly engage the levers 103 and elements 89, are formed to provide knife edges 111 in order to reduce friction.

The lever system is fulcrumed upon the pedestals 25 of the base, the knife edge pivots 105 and 97 resting in the bearings provided by the pedestals 25 on opposite sides of the levers 103 and the pintle carrying portions 93 of the elements 89. The platform and casing element 15 also is provided with legs 113 similar in form to the pedestals 25. These legs are attached as by spot-welding to the platform portions of the shell and depend therefrom within the shell in position to rest upon the fulcrum or pivot elements 107 and 95, so that the platform including the weight indicating means 17 rests upon and is carried by the lever system 13.

The pedestals 25 and the platform legs 113 comprise U-shaped strips of sheet metal, the opposite ends of which are notched to receive bearing plates 115 in one leg, and 117 in the other. The bearing plates 115 are bent to form grooves for receiving one end of the pivot pins and the bearing plates 117 are flat to receive the other end of the pivot pins, whereby to prevent binding of the pivot pins in the bearing plates due to misalignment of the plates as might occur if grooved bearings were employed at both of the ends of the pivot pins. The bearing plates 115 and 117 also are rockably secured in the pedestals and legs, the opposite edges of the plates being notched to interfittingly receive the opposed edges of the leg and pedestal elements. To facilitate assembly of the bearing plates in the legs and pedestals, the latter are weakened by drilling, as at 119, at one side of the notch which recedes the bearing plates so that the plates after being dropped in place in the notches may be secured by bending a portion 121 into position retaining the plates rockably in place in the notches. The previously described lever system, it will be noted, is, with the exception of the pivot pins and the links 109, integrated entirely from sheet metal parts, many of which are of identical form to the end that manufacturing costs may be substantially minimized.

As an additional feature, and to prevent undue lateral movement of the levers and to aid in retaining them in operative position, the plate 52 is formed with dependent fingers 123 struck therefrom in position extending on opposite sides of the lever 75 and the levers 103.

As heretofore stated the main lever 75 of the system is connected with one end of the spring 19, by means of a fitting embodying a hook 101, which may be anchored on the lever by insertion through the perforation 99. The other end of the spring 19 is formed with a hook 125 which is or may be adjustably secured to the housing element 15. To this end the hook 125 is preferably secured in an opening formed in one flanged end of a U-shaped spring element 127, the other end of which engages a mounting bracket 129 welded or otherwise secured on the shell 15 opposite a slotlike opening 131. The bracket 129 receives a threaded stem 133, which carries a nut 135 above the bracket in position with peripheral portions of the nut extending outwardly of the shell through the opening 131. The stem 133 extends through an opening in the bracket 129, through both arms of the spring 127 and has a head flattened on one side for engagement with the flange of the spring 127 in which the hook 125 of the weighing spring is received. The spring 127 also has a flanged end engaging an edge of the bracket 129 to prevent rotation of the spring 127 about the threaded stem 133. The stem 133 is thus held from turning with respect to the bracket by means of the spring 127, so that when the nut 135 is rotated the stem 133 may be raised or lowered on the bracket 129, lost motion being prevented by the spring 127. The weighing spring 19 is thus adjustably mounted on the casing 15 and may be adjusted by means of the thumb nut 135.

As heretofore mentioned, the lever system is arranged to move the rack 63 in response to the deposition of a weight to be measured on the platform, and we prefer to provide a yielding driving connection in order to protect the indicator from injury due to shock, which may result from sudden application of weight on the platform. To this end the lever 75 carries a drive element 137, preferably in the form of a leaf spring, having a portion adapted to underlie the lower end of the rack 63, which preferably is pointed to reduce its frictional area of engagement on the actuating element 137. The spring also is preferably bent, as at 139, adjacent its point of connection on the lever 75 in order to increase the resilient strength of the spring and to eliminate the possibility of fatigue failure thereof. As shown in Figure 11, the indicator actuating element 137 may comprise a bearing plate 141 grooved as at 143 to receive the lower end of the rack 63, said plate 141 being pivotally mounted on the lever 75, as at 145 and being normally urged upwardly to a position limited by the stop 147, by means of a spring element 149 anchored at one end as at 151 on the lever and at the other end substantially at the rack receiving portion of the plate. If a sudden jar is transmitted through the lever system to the rack 63, the spring actuated transfer element 137 may yield in order to minimize the effect of the shock on the indicator mechanism. The arm 73, which is attached on the rack, is simply to apply a tilting movement in the rack in order to hold it in snug driving relationship on the pinion.

We also provide interfitting means, preferably comprising sheet metal keepers 153 on the base 11, and inwardly projecting latch prongs 155 on the shell 15 for holding the shell and base together in operative relationship upon the weighing mechanism. The latch prongs and keepers are arranged to snap into interlocking relationship when the frame is applied to the bottom of the shell after the weighing levers and other elements of the scale have been assembled in the housing. The latch prongs 155 to this end have beveled edges 157 which have a camming action on the flexible keepers 153 to permit such snap action during assembling. After the parts are thus assembled, however, the keepers do not hamper or interfere with downward movement of the platform and the housing element during weighing operation, but serve to limit the upward movement of the casing with respect to the base, as for example when the scale is lifted by grasping the casing. The interfitting latch prongs and keepers thus serve to hold the casing and base together in operative position, and to maintain the pivot pins in position on their bearings.

It is thought that the invention and its numerous attendant advantages will be understood from the foregoing description and it is obvious that numerous changes may be made in the form, construction, and arrangement of the several parts without departing from the spirit or scope of the invention, or sacrificing its attendant advantages, the form herein described being a preferred embodiment for the purpose of illustrating the invention.

Having thus described our invention, what we claim is new and desire to secure by Letters Patent of the United States, is as follows:

1. A weighing scale comprising a base, weighing mechanism comprising a system of levers fulcrumed on said base, a weight receiving platform on said levers, and a resilient weighing means on which said system of levers is yieldingly suspended, said resilient means comprising a spring connected at one end to said lever system, and adjustable means for attaching the other end to said spring on the weight receiving platform, said adjustable means comprising a pin adapted for longitudinal movement on the platform, manually operable means for adjustably moving said pin on the platform, spring means normally urging the pin in one direction on the platform, said spring means being connected on said pin to prevent rotation thereof with respect to the platform, and means securing said spring means against rotation with respect to the platform.

2. A weighing scale comprising a system of levers, a weight receiving platform on said levers, resilient means on which said system of levers is yieldingly suspended, and means to adjust said resilient means, comprising, a bracket, a threaded pin extending through an opening in said bracket, a manually operable nut for shifting the pin axially in the bracket, spring means interconnecting said pin and bracket and serving to urge the pin axially in one direction with respect to the bracket, means to hold said spring against rotation with respect to the bracket and to hold said pin against relative rotation with respect to the spring means whereby to prevent rotation of the pin with respect to the bracket, and means to anchor the resilient weighing element on said pin.

3. A weighing scale comprising a system of levers, a weight receiving platform on said levers, and a resilient weighing element on which said lever system is yieldingly suspended, said system including a main lever comprising a strip bent to provide spaced arms, means interconnecting said arms, members secured on said arms and having projecting portions extending beyond said arms, a plurality of pivot pins in the projecting portions of said arms, corresponding pivot pins in the several arms being in axial alinement, auxiliary levers each having pivot pins at one end, each lever being linked at its other end to one of the arms of the main lever at a point intermediate the opposed ends of the main lever, said auxiliary and main levers having perforations to receive a hardened wire link formed with knife edges in the portions thereof which engage the main and auxiliary levers, the several auxiliary levers having identical spacement between their corresponding pivot pins and between said pivot pins and the link receiving perforation.

4. A weighing scale comprising a sheet metal base, weighing mechanism comprising a system of interconnected levers fulcrumed on said base, said base having upstanding bearing pedestals for receiving said lever system, and a sheet metal shell supported on said levers, said shell having depending legs in position to engage said lever system and the shell providing a weight receiving platform having an indicator opening and an indicator housing enclosing said opening, an indicator mounted on said shell in said opening and extending within said housing, said indicator being carried on a bracing plate secured on said shell on opposite sides of said opening bracing and strengthening the platform, and interfitting latch means on said base and said shell for holding said parts together upon said lever system.

5. A weighing scale comprising a base, weighing mechanism comprising a system of interconnected levers fulcrumed on said base, resilient weighing means connected with said system of levers, an indicator, a sheet metal shell supported on said system of levers and providing a weight receiving platform having an opening for receiving the indicator, said shell carrying a sheet metal portion forming an indicator housing enclosing said opening, a bracing plate extending between and secured to said platform on opposite sides of said opening for the purpose of strengthening said platform, means on said bracing plate forming a mounting for supporting the indicator in position extending within said housing, and means drivingly connecting said indicator with said system of levers.

6. A weighing scale comprising a base, weighing mechanism comprising a system of interconnected levers fulcrumed on said base, resilient weighing means connected with said system of levers, a sheet metal shell supported on said system of levers and providing a weight receiving platform formed with an indicator opening, a bracing plate secured to said platform on opposite sides of said opening for the purpose of strengthening said platform, means on said bracing plate forming a mounting, an indicator on said mounting in position extending in said opening and above said platform, means comprising a drawn sheet metal portion carried by said platform at said opening to form a housing enclosing said indicator above said opening, and means drivingly connecting said indicator with said system of levers, said lever system being movable with respect to the platform, including a lever element extending beneath said bracing plate, and means carried by the platform and extending downwardly of said bracing plate for restricting lateral movement of said lever element with respect to the plate.

7. A weighing scale comprising a base, weighing mechanism comprising a system of interconnected levers fulcrumed on said base, resilient weighing means connected with said system of levers, an indicator, a sheet metal shell supported on said system of levers and providing a weight receiving platform having an opening for receiving the indicator, said shell carrying a sheet metal portion forming an indicator housing enclosing said opening, a bracing plate extending between and secured to said platform on opposite sides of said opening for the purpose of strengthening said platform, said bracing plate having an opening, means forming alined bearings on said plate on opposite sides of said opening, a shaft extending in said bearings, said indicator being carried by said shaft and having portions extending in said housing above said platform, a pinion on said shaft, said plate carrying means forming a guide way opposite said pinion, a rack slidable in said guide way in position to drivingly engage the pinion, and means to shift said rack in said guide way in response to movement of said system of levers.

8. A weighing scale comprising a base, weighing mechanism comprising a system of interconnected levers fulcrumed on said base, resilient weighing means connected with said system of levers, an indicator, a sheet metal shell supported on said system of levers and providing a weight receiving platform having an opening for receiving the indicator, said shell carrying a sheet metal portion forming an indicator housing enclosing said opening, a bracing plate extending between and secured to said platform on opposite sides of said opening for the purpose of strengthening said platform, said bracing plate having an opening, means on said plate forming alined bearings on opposite sides of said opening, said indicator being mounted in said opening and having a shaft extending in said bearings, said shaft having pointed ends projecting outwardly of the bearings and said plate having struck out portions in position to abut the pointed ends of said shaft, and means to drivingly connect said rotatable indicator element with said system of levers.

9. A weighing scale comprising a base, weighing mechanism comprising a system of interconnected levers fulcrumed on said base, resilient weighing means connected with said system of levers, an indicator, a sheet metal shell supported on said system of levers and providing a weight receiving platform having an opening for receiving the indicator, said resilient weighing means comprising a spring connecting said system of levers with said shell whereby said system of levers is yieldingly suspended on the shell, said shell carrying a sheet metal portion forming an indicator housing enclosing said opening, a bracing plate extending between and secured to said platform on opposite sides of said opening for strengthening said platform, means on said bracing plate forming a mounting, said indicator being rotatably carried on and by said mounting in position extending within said housing, said housing being formed with an upwardly facing window through which said rotatable indicator is exposed, means carried on said housing and forming a stationary indicator index at said window, and means drivingly connecting said indicator with said system of levers.

10. A weighing scale comprising a base, weighing mechanism comprising a system of interconnected levers fulcrumed on said base, resilient weighing means connected with said system of levers, an indicator, a sheet metal shell supported on said system of levers and providing a weight receiving platform having an opening for receiving the indicator, said resilient weighing means comprising a spring connecting said system of levers with said shell whereby said system of levers is yieldingly suspended on the shell, said shell carrying a sheet metal portion forming an indicator housing enclosing said opening, a bracing plate extending between and secured to said platform on opposite sides of said opening for strengthening said platform, means on said bracing plate forming a mounting, said indicator being angularly movable on said mounting in position extending within said housing, said system of levers including an element formed with a seat, said bracing plate carrying means forming a guide-way, a rack shiftable in said guide-way, said rack having a portion in position to bear upon said seat whereby movement of said system of levers with respect to said shell may be translated into sliding movement of said rack in said guide-way, and means to turn said indicator on said bracing plate in response to the movement of said rack.

11. A weighing scale comprising a base, weighing mechanism comprising a system of interconnected levers fulcrumed on said base, resilient weighing means connected with said system of levers, an indicator, a sheet metal shell supported on said system of levers and providing a weight receiving platform having an opening for receiving the indicator, said resilient weighing means comprising a spring connecting said system of levers with said shell whereby said system of levers is yieldingly suspended on the shell, said shell carrying a sheet metal portion forming an indicator housing enclosing said opening, a bracing plate extending between and secured to said platform on opposite sides of said opening for strengthening said platform, means on said bracing plate forming a mounting, said indicator being rotatable on said mounting and disposed in said platform opening and extending above said plate within said indicator housing, a pinion drivingly connected with said indicator, said system of levers comprising a lever element having a sheet metal portion projecting therefrom to form a seat, means carried by said bracing plate and comprising spaced sheet metal portions forming a rack guide opposite said driving pinion, and a rack element in said guide between said sheet metal portions, said rack being supported for longitudinal movement by said guide in position to drivingly engage said pinion, said rack having a portion formed at one end thereof to rest upon the sheet metal projection carried by said lever whereby relative movement of the lever system including said lever with respect to the platform may be translated into longitudinal movement of the rack in said guide and thence through said pinion into relative angular movement of the indicator with respect to said bracing plate.

12. A weighing scale comprising a base, weighing mechanism comprising lever means forming a system of interconnected levers fulcrumed on said base, a weight carrying platform supported by said system of levers, an indicator, said platform comprising a sheet metal shell forming the weight receiving platform and having an opening for receiving the indicator, said shell carrying a sheet metal portion forming an indicator housing enclosing said opening above the platform, a resilient weighing element carried by said shell and on which said system of levers is yieldingly suspended whereby the weight measuring element is deflected with respect to the platform by the system of levers in response to the application of a weight on the platform, dependent means on said platform providing downwardly facing bearings, means forming knife edge projections on the lever means in position to engage said downwardly facing bearings, means carried by said platform in position to engage the opposed sides of at least one of said levers to limit lateral movement of said lever with respect to said shell, a bracing plate on said platform and secured thereto on opposite sides of said opening for the purpose of strengthening the platform, said bracing plate forming a mounting, said indicator being carried on said mounting in position extending within said housing, means to drive said indicator in response to movement of the system of levers with respect to said platform, and interfitting means carried by the platform and extending in position to operatively engage the base to retain the platform and base in operating assembled relationship upon said system of levers without interfering with the depressible weighing movement of the platform with respect to the base under the influence of a weight applied on the platform for measurement.

13. A weighing scale comprising a base, weighing mechanism comprising lever means forming a system of interconnected levers fulcrumed on said base, an indicator, a sheet metal shell supported by said system of levers and forming a weight receiving platform having an opening for receiving the indicator, said shell carrying a sheet metal portion forming an indicator housing enclosing said opening above the platform, a resilient weighing element carried by said shell and on which element said system of levers is yieldingly suspended whereby the weight measuring element may be deflected with respect to the platform by the system of levers in response to the application of a weight on the platform, dependent means on said platform providing downwardly facing bearings, means forming knife edge projections on the lever means in position to engage said downwardly facing bearings, means carried by said platform in position to engage the opposed sides of at least one of said levers to limit lateral movement of said lever with respect to said shell, a bracing plate on said platform and secured thereto on opposite sides of said opening for the purpose of strengthening the platform, said bracing plate forming a mounting, said indicator being carried on said mounting in position extending within said housing, means to drive said indicator in response to movement of the system of levers with respect to said platform, and interfitting means on the platform and base and comprising cam-like projections on the shell and cooperating depressible latch keepers on the base for interlockingly receiving said cam-like projections whereby to secure the base and the platform in operating assembled relationship upon the system of levers.

14. A weighing scale comprising a sheet metal plate forming a base and having an upstanding peripheral flange to strengthen the plate, the body of the plate within the flange being embossed to rigidify the same, bent strap metal means fastened on said plate and providing upwardly facing spaced apart bearings within and adjacent said flange, weighing mechanism comprising lever means forming a system of interconnected levers fulcrumed on said bearings, an indicator, a sheet metal shell supported by said system of levers and forming a weight receiving platform having an opening for receiving the indicator, said shell carrying a sheet metal portion forming an indicator housing enclosing said opening above the platform, resilient weighing means carried by said shell and on which said system of levers is yieldingly suspended whereby the weight measuring element is deflected with respect to the platform by the system of levers in response to the application of a weight on the platform, dependent means on said platform and providing downwardly facing bearings, a bracing plate on said platform and secured thereto on opposite sides of said opening for the purpose of strengthening the platform, means on said bracing plate forming a mounting, said indicator being carried on said mounting in position extending within said housing, and means to drive said indicator in response to movement of the system of levers with respect to said platform.

15. A weighing scale comprising a sheet metal plate forming a base and having an upstanding peripheral flange to strengthen the plate, the body of the plate within the flange being embossed to rigidify the same, bent strap metal means fastened on said plate and providing upwardly facing spaced apart bearings within and adjacent said flange, weighing mechanism comprising lever means forming a system of interconnected levers fulcrumed on said bearings, an indicator, a sheet metal shell supported by said system of levers and forming a weight receiving platform having an opening for receiving the indicator, said shell carrying a sheet metal portion forming an indicator housing enclosing said opening above the platform, resilient weighing means carried by said shell and on which said system of levers is yieldingly suspended whereby the weight measuring element is deflected with respect to the platform by the system of levers in response to the application of a weight on the platform, dependent means on said platform and providing downwardly facing bearings, a bracing plate on said platform and secured thereto on opposite sides of said opening for the purpose of strengthening the platform, means on said bracing plate forming a mounting, said indicator being carried on said mounting in position extending within said housing, and means to drive said indicator in response to movement of the system of levers with respect to said platform, said platform shell having a depending marginal skirt and said base plate being formed to fit within said skirt and close the bottom thereof, and cooperating latch means on said shell and said base forming plate to hold the same together upon said lever system.

16. A weighing scale comprising a base, weighing mechanism comprising a system of interconnected levers fulcrumed on said base, resilient weighing means connected with said system of levers, an indicator, a sheet metal shell supported on said system of levers and providing a weight receiving platform having an opening for receiving the indicator, said resilient weighing means comprising a spring connecting said system of levers with said shell whereby said system of levers is yieldingly suspended on the shell, said shell carrying a sheet metal portion forming a housing enclosing said opening above the platform, a bracing plate extending between and secured to said platform on opposite sides of said opening for strengthening said platform, said bracing plate forming a mounting and having an opening, means on said plate providing alined bearings on opposite sides of the opening in said plate, said indicator being disposed in the opening of said plate and extending in said housing, said indicator element being mounted on and rotatable with a shaft having oppositely projecting ends supported in said bearings and extending outwardly of said bearings, said plate having struck-out portions in position abutting the opposed ends of said shaft whereby to limit axial movement of the shaft in said bearings, and means drivingly connecting said indicator with said system of levers.

MATHIAS J. WEBER.
RUSSELL E. VANDERHOFF.